United States Patent
Pérez Robles et al.

(10) Patent No.: US 12,534,625 B2
(45) Date of Patent: Jan. 27, 2026

(54) TUNGSTATE- AND MOLYBDATE-BASED CERAMIC COATING FOR PROTECTION OF METAL SURFACES, PREPARATION PROCEDURE AND USE THEREOF

(71) Applicant: MABE, S.A. DE C.V., Querétaro (MX)

(72) Inventors: Juan Francisco Pérez Robles, Querétaro (MX); Sarai Esmeralda Favela Camacho, Querétaro (MX); Juan Alejandro Menchaca Rivera, Querétaro (MX); Ma Esperanza Del Castillo Chagoya, Querétaro (MX); Marco Antonio Guel Coreno, Querétaro (MX); Gilberto Magaña Loredo, Querétaro (MX); Christian Morales Ramirez, Querétaro (MX); Asahel Saúl Robles Bustos, Querétaro (MX)

(73) Assignee: CONTROLADORA MABE S.A. DE C.V., Mexico City (MX)

( * ) Notice: Subject to any disclaimer, the term of this patent is extended or adjusted under 35 U.S.C. 154(b) by 770 days.

(21) Appl. No.: 17/682,673

(22) Filed: Feb. 28, 2022

(65) Prior Publication Data
US 2022/0348771 A1    Nov. 3, 2022

(30) Foreign Application Priority Data
Apr. 30, 2021 (MX) .................... MX/a/2021/005111

(51) Int. Cl.
C09D 1/02        (2006.01)
C04B 35/624   (2006.01)
(Continued)

(52) U.S. Cl.
CPC .............. *C09D 1/02* (2013.01); *C04B 35/624* (2013.01); *C04B 41/0081* (2013.01); *C09D 7/62* (2018.01)

(58) Field of Classification Search
None
See application file for complete search history.

(56) References Cited

U.S. PATENT DOCUMENTS 3,248,250 A * 4/1966 Collins, Jr. ........... C04B 28/342
                                                          106/286.6
2003/0130139 A1   7/2003 Komiyama et al.
(Continued)

FOREIGN PATENT DOCUMENTS

EP            0352246 A2 * 1/1990 ............. C04B 28/26

*Primary Examiner* — Keling Zhang
(74) *Attorney, Agent, or Firm* — Terry M. Sanks, Esq.; Beusse Sanks, PLLC

(57) ABSTRACT

Inorganic ceramic coatings are disclosed whose chemical compositions comprise silicates, acids, metallic oxysalts such as tungstates and molybdates, water, and non-metallic oxides such as silicon oxide. The water-based inorganic ceramic coatings improve the ceramic, anti-corrosive and resistance properties of the metal substrates that are coated with same. A sol-gel process for synthesizing said the coatings comprises a process in which the non-metallic oxide, before being mixed with the rest of the components of the chemical compositions as claimed, can be pre-treated with hydrochloric acid and ammonium hydroxide, or can be sonicated to achieve a particle size in the range from approximately 160 to approximately 180 nm. A method for coating the metal parts with the inorganic ceramic coatings is also disclosed.

4 Claims, 8 Drawing Sheets

(51) Int. Cl.
    *C04B 41/00*    (2006.01)
    *C09D 7/62*    (2018.01)

(56) References Cited

U.S. PATENT DOCUMENTS

2007/0134503 A1* 6/2007 Espinosa ................ C09D 5/106
    106/287.19
2017/0298231 A1 10/2017 Yuasa et al.

* cited by examiner

Mo 100g_f  W 100g_f

TUNGSTATE- AND MOLYBDATE-BASED CERAMIC COATING FOR PROTECTION OF METAL SURFACES, PREPARATION PROCEDURE AND USE THEREOF

TECHNICAL FIELD

The present invention relates to a novel inorganic ceramic coating with improved ceramic, anti-corrosive and mechanical strength properties, which makes it possible to extend the half-life of metal substrates that are exposed to high temperatures, humid and saline environments; a sol-gel process for synthesizing the coating and a method for coating metal parts with the claimed coating.

BACKGROUND

In the state of the art there is a need for ceramic coatings that efficiently prevent thermal oxidation and corrosion of the metal substrates that are used in the production of artifacts that are exposed to high temperatures, humid and saline environments, such as stoves, ovens, thermocouples, water heaters, etc.; so that they preserve their physicochemical and aesthetic properties for a longer time.

There are patent applications that describe chemical coating compositions that use some of the components that are also used for the composition claimed in the present invention. However, the disadvantage of the coatings described below in the prior art, which is known to the applicant, is that they use organic solvents and/or resins, which are increasingly falling out of favor due to the degree of environmental pollution they produce.

For example, patent application US 2017/0298231 describes a coating comprising an organic resin (A), electrically conductive pigments (B) and anti-corrosive pigments (C) to be applied to a metal surface of a motor vehicle; wherein the organic resin (A) can be selected from a polyurethane resin, a polyester resin, an epoxy resin, a (meth)acrylic resin or a polyolefin resin; the anti-corrosive pigments that can be used are sodium and potassium silicates, or silica; and, the electrically conductive pigments (B) that can be used are carbide, nitride and silicide.

Another example is patent application US 2003/0130139, which describes a water-based composition for forming protective coatings for metal surfaces such as iron, steel, stainless steel, aluminum, and others. The coating improves the corrosion resistance of the metal surface.

The composition described in said application comprises water, a water-soluble inorganic salt, selected from the group of sulfates, borates, silicates (such as potassium silicate or sodium silicate), molybdates, vanadates or tungstates (such as sodium tungstate) and a smectite-type clay selected from the group comprising sauconite, beidellite, hectorite, nontronite, saponite, iron saponite and stevensite. Although it is indicated that it is water-based, it is noted that the composition may further comprise a lubricant selected from the group consisting of oils, soaps, waxes, and polytetrafluoroethylene.

Therefore, the inorganic ceramic coating as claimed in the present invention, in addition to improving the anti-corrosive properties and protecting the metal substrates from thermal oxidation and humid and saline environments, is sustainable because it is a water-based composition.

BRIEF DESCRIPTION OF THE INVENTION

The present application provides inorganic ceramic coatings that respond to the need raised above and that comprise at least one silicate-based component, at least one acid, at least one metallic oxysalt of a family 6 (VIB) element of the periodic table and water.

In one embodiment of the invention, the family 6 (VIB) element is selected from tungsten, molybdenum, or a combination thereof.

Also, the present invention provides a sol-gel process for synthesizing the coatings referred to above. Said process uses a solvent that can be selected from an organic solvent, water, or a combination thereof.

In one embodiment of the invention, the organic solvent is an aliphatic alcohol that is selected from ethanol, methanol or propanol.

In a preferred embodiment of the invention, the solvent is water. This embodiment is preferred because it is more environmentally friendly and reduces production costs.

The coating of the invention achieves an improvement in the anti-corrosive and ceramic properties of the substrates on which it is applied, thus lengthening the half-life of the substrates, for example, metal substrates.

In a preferred embodiment of the invention, the coating of the invention is resistant to temperatures ranging from approximately 25° C. to approximately 500° C.

The coating of the substrate is achieved by depositing a thin layer of the chemical composition (inorganic ceramic coating) thereon by a mechanical method also claimed in the present application, which can be selected from dipping or spraying.

an inorganic coating of the invention that has molybdenum (Mo) in its chemical structure and b) an inorganic coating according to another embodiment of the invention that has tungsten (W) in its chemical structure, after having applied a load of 1000 $g_f$ by means of a microdurometer. In these photographs, it is observed that both coatings have fractures; however, it is the inorganic coating comprising tungsten that has larger fractures, such as 57.01 micrometers.

Figure 1:
FIG. 1 shows the photograph of the indentation marks formed on the surface of a copper plate coated with the second composition as claimed in the present invention and described hereunder: a) an inorganic coating of the invention that has molybdenum (Mo) and b) a coating according to another embodiment of the invention that has tungsten (W) after having applied a load of 100 $g_f$ by means of a microdurometer. In this photograph, it is observed that the inorganic coating that has tungsten is the only one that has small fractures.
Figure 1:
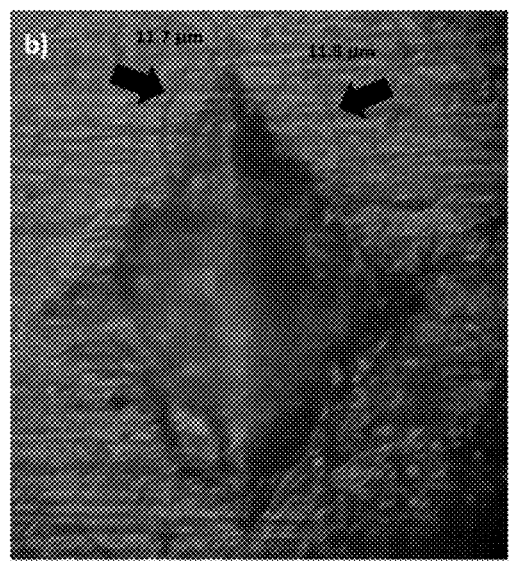
Figure 2:
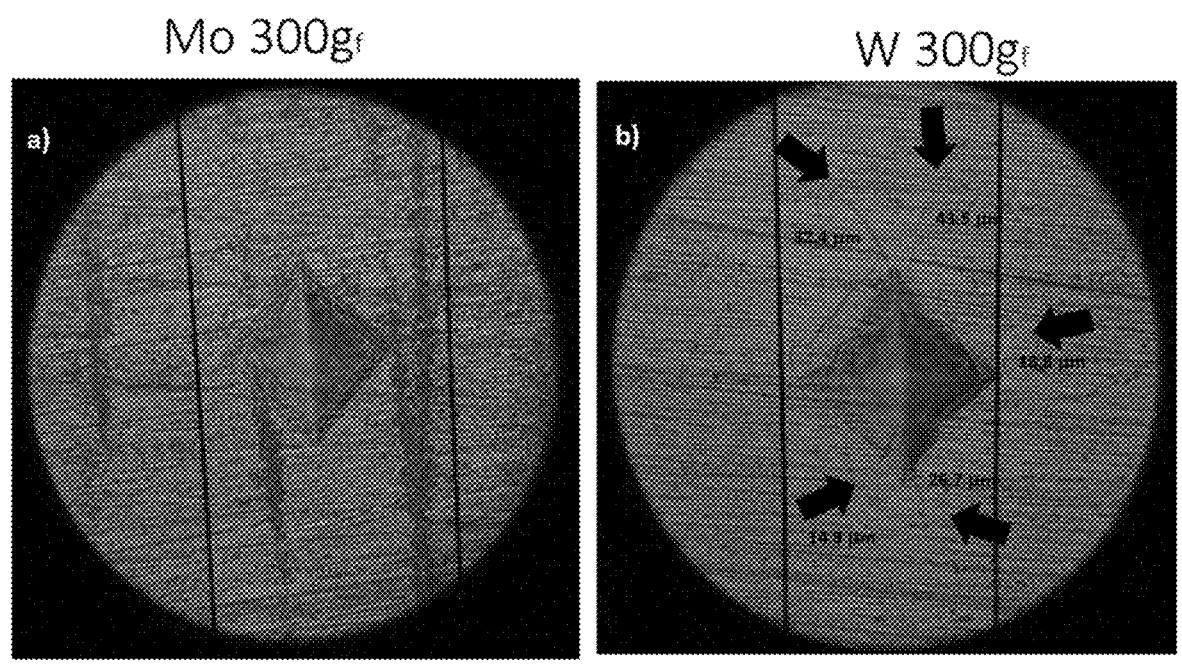
FIG. 2 shows the photograph of the indentation marks formed on the surface of a copper plate coated with the second composition as claimed in the present invention: a) an inorganic coating of the invention that has molybdenum (Mo) and b) an inorganic coating according to another embodiment of the invention that has tungsten (W) after having applied a load of 300 $g_f$ by means of a microdurometer. In said photographs, it is observed that after applying said load to the coatings, the inorganic coating that comprises molybdenum does not have fractures while the inorganic coating that comprises tungsten does have them.
Figure 3:
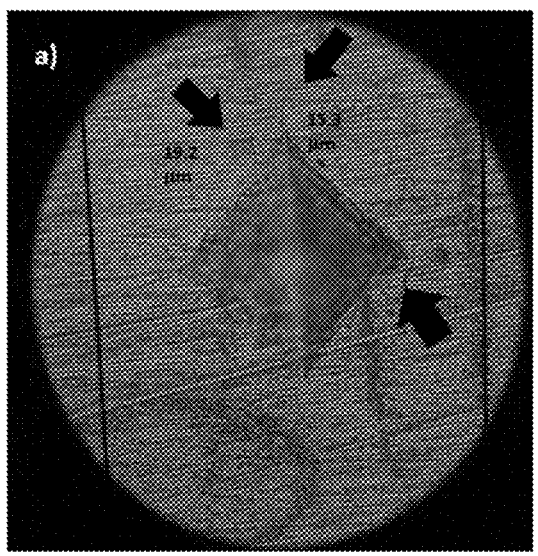
FIG. 3 shows the photograph of the indentation marks formed on the surface of a copper plate coated with the second composition as claimed in the present invention: a) an inorganic coating of the invention that has molybdenum (Mo) and b) an inorganic coating according to another embodiment of the invention that has tungsten (W) after having applied a load of 500 $g_f$ by means of a microdurometer. In these photographs, it is observed that both coatings have fractures with a length ranging from approximately 15 to approximately 34 micrometers and, although the length of the fractures present in both materials is of the same order, the tungsten coating has fractures of greater length.
Figure 3:
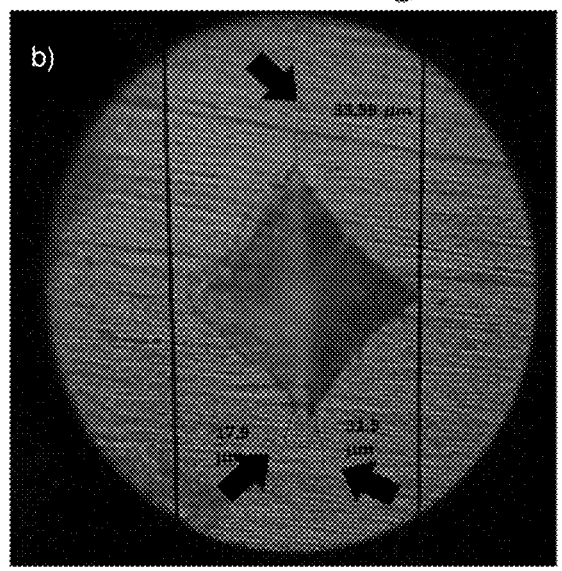
Figure 4:
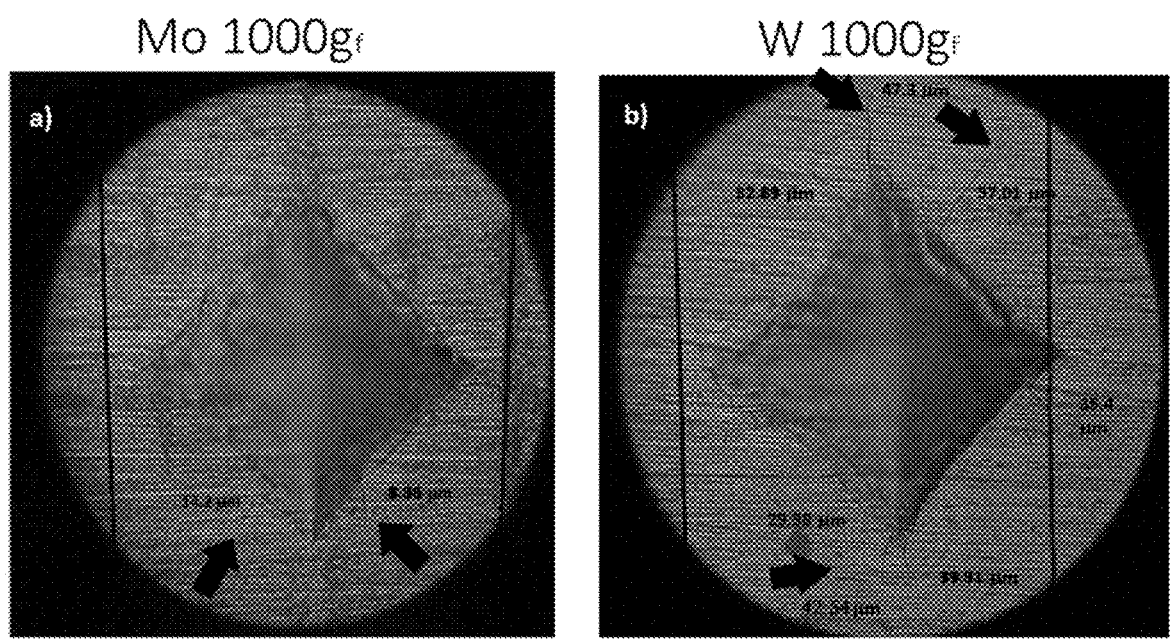
FIG. 4 shows the photograph of the indentation marks formed on the surface of a copper plate coated with the second composition as claimed in the present invention: a)
Figure 5:
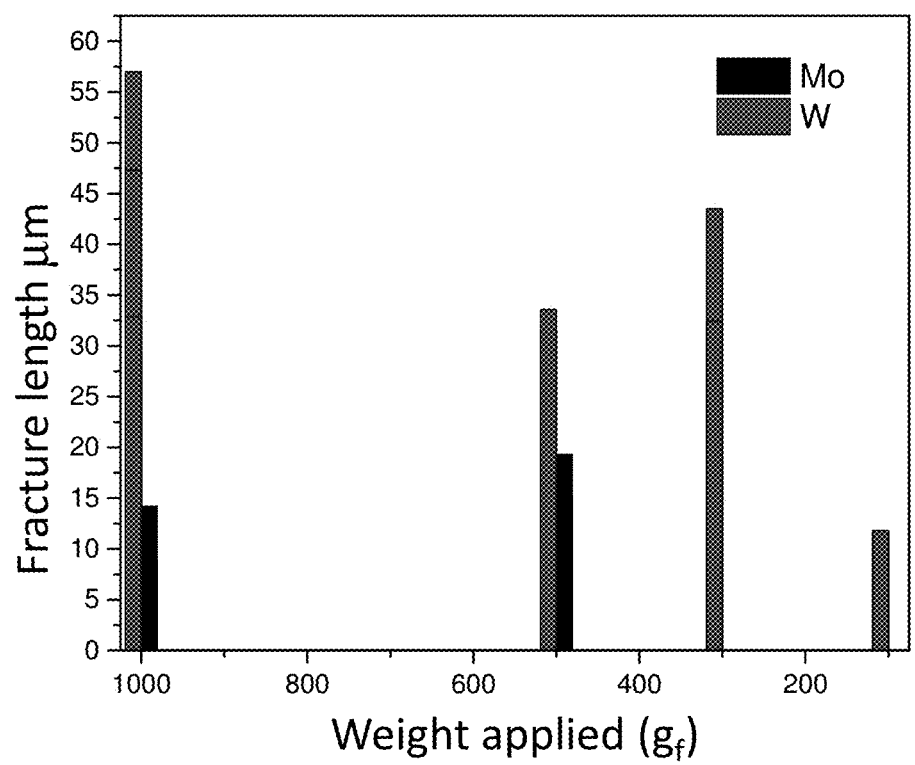

FIG. 5 is a bar graph that relates the fracture length (given in micrometers) with the weight applied (gf)—100, 300, 500 and 1000—by means of a microdurometer to a copper plate coated with the second composition as claimed in the present invention: an inorganic coating of the invention that has molybdenum (black bars) and to a copper plate coated with an inorganic coating according to another embodiment of the invention that has tungsten (red bars).

Figure 6:
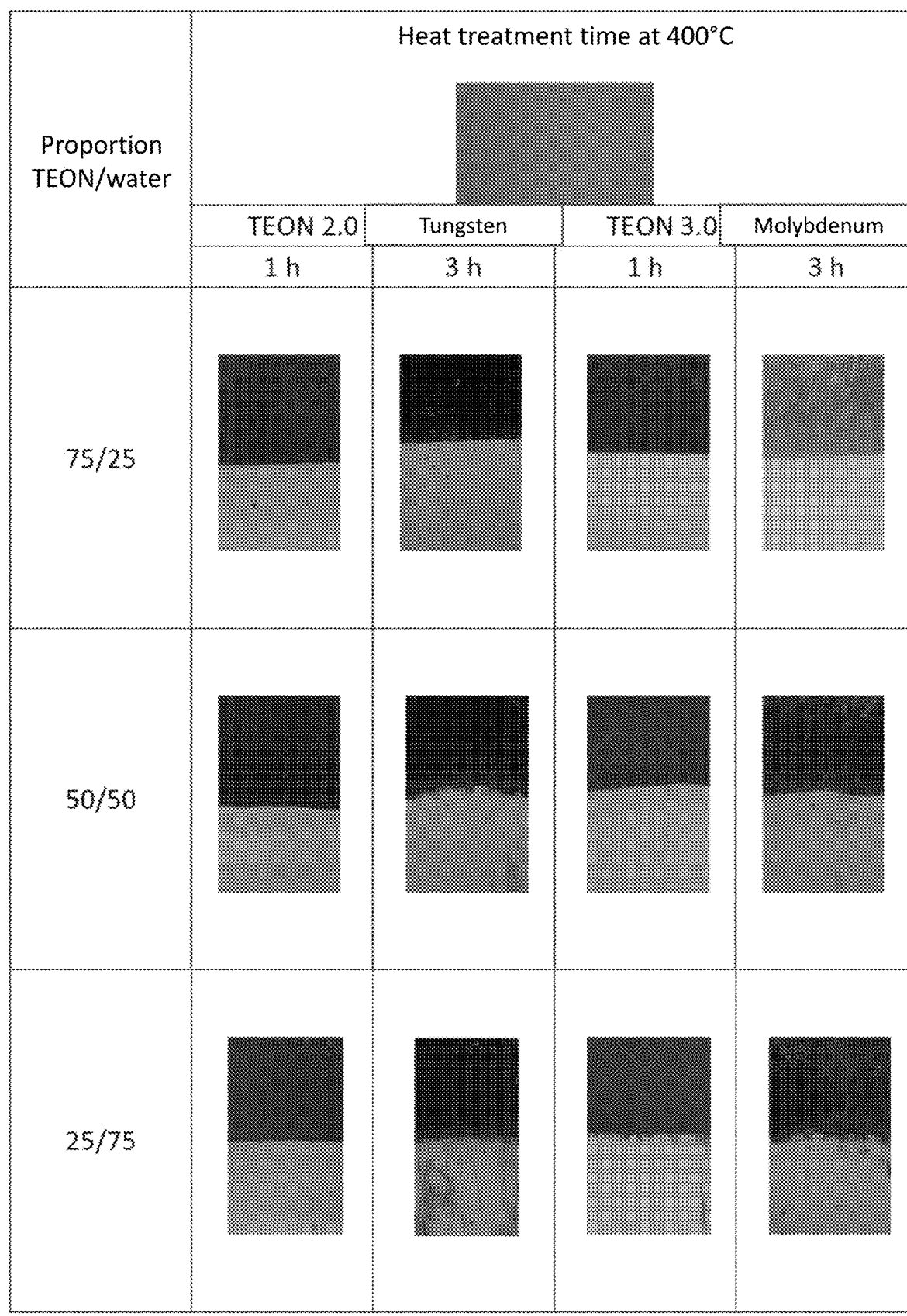

FIG. 6 shows the qualitative results, by means of images arranged in a table, of the barrier effect provided by the inorganic coatings of the second composition as claimed in the present invention that comprise molybdenum and tungsten (diluted in water) that were applied to one half (according to the arrangement of the images, said half corresponds to the bottom half) of the copper plates that were subjected to a temperature of approximately 400° C. for approximately 1 hour and approximately 3 hours. The coatings in said figure are referred to in the image as "TEON 2.0" and "TEON 3.0", respectively.

Figure 7:
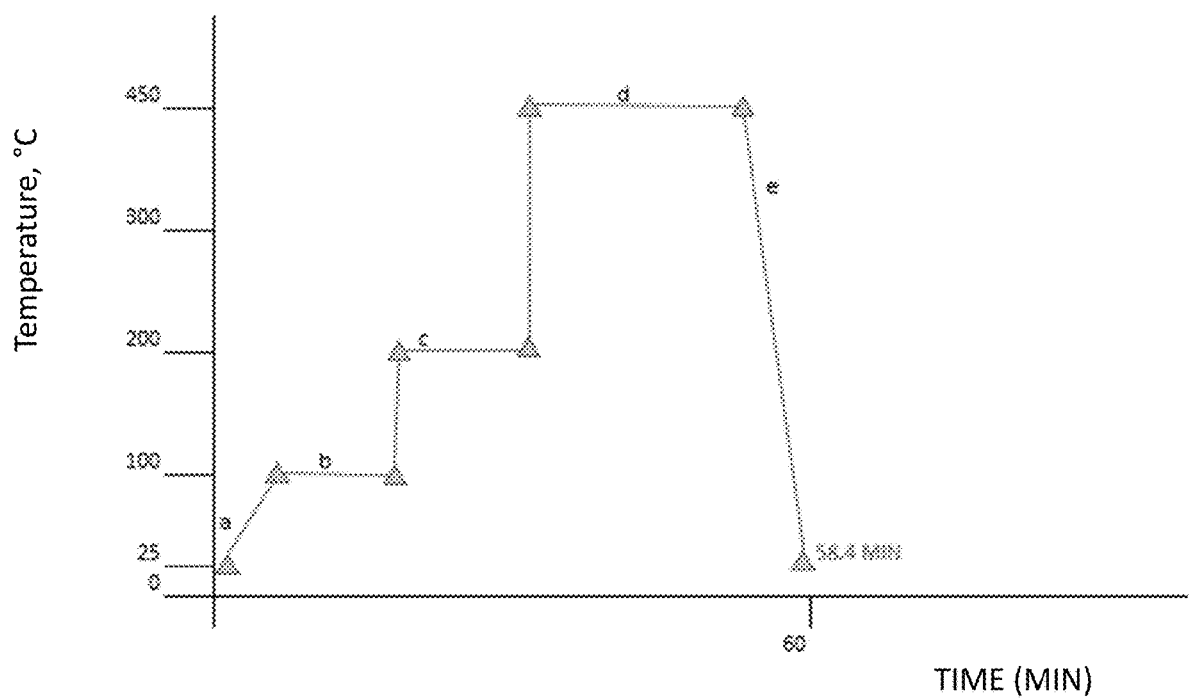

FIG. 7 shows a graph of temperature versus time derived from a process of heating ramps used in the method by which the inorganic ceramic coating of the first composition is deposited as claimed in the present invention.

Figure 8A:
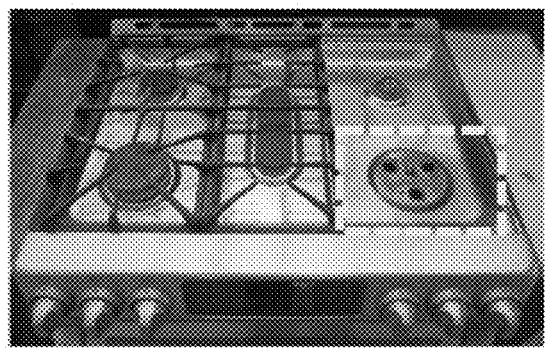
Figure 8B:
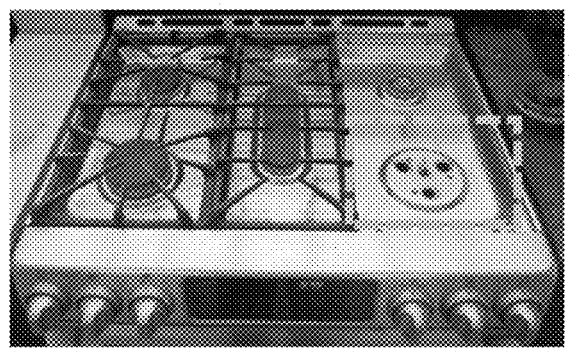

FIG. 8*a* shows the appearance of a stove without an inorganic ceramic coating after being subjected to a heating test. FIG. 8*b* shows the appearance of a stove coated with the inorganic ceramic coating of the first composition as claimed in the present invention after having been subjected to a heating test.

DETAILED DESCRIPTION OF THE PRESENT INVENTION

The following definition is provided for the purpose of allowing a better understanding of the invention:

"Approximately": The use of the term "approximately" provides a certain additional range with respect to the numerical value to which it is being applied. This additional range is ±10%. In an exemplary but non-limiting manner, if it says "approximately 25° C.", the exact range that is described and/or claimed is between 22.5° C. and 27.5° C.

"At least": This term refers to the minimum amount of components that the system of the invention can constitute so as to obtain the desired technical effect. The maximum amount of components will be apparent from the following detailed description of the invention.

Chemical formulation or chemical composition: These terms are handled as synonyms throughout the description and refer to the chemical components and the proportion in which they are found in the inorganic ceramic coating.

The chemical composition of the inorganic ceramic coatings claimed in the present invention comprises:

at least one silicate-based component, at least one acid, at least one metallic oxysalt of a family 6 (VIB) element of the periodic table and water.

In one embodiment of the invention, the chemical composition of the inorganic ceramic coatings further comprises a non-metallic oxide.

The non-metallic oxide is silicon oxide ($SiO_2$).

The at least one silicate-based component comprises a silicate or a combination of two or more silicates.

In one embodiment of the invention, the silicate can be selected from potassium silicate ($K_2SiO_3$), sodium silicate ($Na_2SiO_3$), or a combination thereof.

The at least one acid can be selected from boric acid ($H_3BO_4$), phosphoric acid ($H_3PO_4$) or sulfuric acid ($H_2SO_4$).

In a preferred embodiment of the invention, the chemical composition of the inorganic coating comprises boric acid.

The at least one metallic oxysalt can be selected from tungstates, molybdates, or a combination thereof.

In one embodiment of the invention, the at least one metallic oxysalt is sodium tungstate ($Na_2WO_4$).

In another embodiment of the invention, the at least one metallic oxysalt is sodium molybdate ($Na_2MoO_4$).

In a first composition of the invention, the ceramic coating comprises at least one silicate-based component comprising from approximately 28% by mass to approximately 47% by mass of potassium silicate and from approximately 3.5% by mass to approximately 8% by mass of sodium silicate; at least one acid in the range from approximately 0.05% by mass to approximately 0.25% by mass; at least one metallic oxysalt of a family 6 (VIB) element in the range from approximately 0.5% by mass to approximately 2% by mass; water from approximately 47% by mass to approximately 70% and a non-metallic oxide in the range from approximately 0.1% by mass to approximately 0.75% by mass.

Preferably, the at least one silicate-based component comprises from approximately 30% by mass to approximately 43% by mass of potassium silicate and from approximately 4.5% by mass to 7.5% by mass of sodium silicate.

The at least one acid is preferably in the range from approximately 0.075% by mass to approximately 0.20% by mass, wherein the acid is boric acid, phosphoric acid or sulfuric acid, preferably boric acid.

The at least one metallic oxysalt of a family 6 (VIB) element preferably falls within the range from approximately 0.6% by mass to approximately 1.5% by mass; wherein the metallic oxysalt is a salt of sodium tungstate or sodium molybdate.

Preferably, the water is in a range from approximately 50% by mass to approximately 65%.

The non-metallic oxide is preferably in the range from approximately 0.15% by mass to approximately 0.5% by mass, wherein the non-metallic oxide is silicon oxide.

In a second composition of the invention, the ceramic coating comprises at least one silicate-based component comprising from approximately 20% by mass to approximately 70% by mass of potassium silicate; at least one acid in the range from approximately 0.5% by mass to approximately 10% by mass; at least one metallic oxysalt of a family 6 (VIB) element in the range from approximately 0.5% by mass to approximately 10% by mass; and water from approximately 20% by mass to approximately 70%.

In a preferred embodiment, the second composition further comprises from approximately 1.0% by mass to 15% by mass of sodium silicate and a non-metallic oxide in the range from approximately 1.0% by mass to approximately 15% by mass.

Preferably, the second composition of the invention comprises from approximately 25% by mass to approximately 65% by mass of potassium silicate; sodium silicate, when present, ranges from approximately 1% by mass to approximately 10%.

The at least one acid is preferably in the range from approximately 0.75% by mass to approximately 8% by mass; wherein the acid is boric acid, phosphoric acid or sulfuric acid, preferably boric acid.

The at least one metallic oxysalt of a family 6 (VIB) element is preferably present from approximately 0.75% by mass to approximately 8% by mass; wherein the metallic oxy salt is a salt of sodium tungstate or sodium molybdate.

The water preferably ranges from approximately 25% by mass to approximately 65% by mass.

Similarly, the non-metallic oxide, if present, is preferably in the range from approximately 1% by mass to approximately 10% by mass, where the non-metallic oxide is silicon oxide.

The sol-gel process for synthesizing the inorganic ceramic coating of the first composition as claimed in the present invention, characterized in that it comprises at least the following steps:

mixing water with the at least one non-metallic oxide in a stirring tank so as to obtain a dispersion;

stirring said mixture for approximately one hour at room temperature;

adding to the dispersion obtained an aqueous solution of the first silicate-based component and mechanically stirring the resulting mixture at room temperature;

adding to the dispersion obtained from the previous step, an aqueous solution of the second silicate-based component and mechanically stirring the resulting mixture at room temperature;

stopping stirring when a homogeneous mixture is obtained;

leaving the mixture to rest in order to achieve a homogeneous dispersion of the non-metallic oxide with the silicates for a period of time that is comprised in the range from approximately 50 minutes to approximately 70 minutes;

once the homogeneous dispersion is reached, pouring into the mixture in the container, an aqueous solution of the at least one acid and stirring mechanically for a time from approximately 50 minutes to approximately 70 minutes;

once the at least one acid has been added, adding an aqueous solution of the at least one metallic oxysalt;

subsequently, homogenizing the resulting mixture by mechanical stirring;

with constant stirring, heating the mixture resulting from step i) to a temperature of approximately 60° C. for a time ranging from approximately 30 minutes to approximately 3 hours;

at the end of the heating time, stopping the stirring and measuring the viscosity of the mixture resulting from step j) to determine if it is in the range from approximately 1.6 mPa s to approximately 2 mPa s, if the viscosity is outside said range, proceeding to step 1);

adding an additional volume of water, to approximately 3% of the volume of the mixture and stirring to achieve a viscosity of the resulting mixture that is in the range from approximately 1.6 mPa s to approximately 2 mPa s;

once the viscosity complies with the mentioned parameters, the coating is ready for use.

In one embodiment of the invention, the silicates can be added simultaneously. Sodium silicate is prepared by mixing in water, sodium oxide to 9-10% m/m of the solution with silicon oxide to 29-30% m/m of the solution. Potassium silicate is prepared by mixing water, potassium oxide to 8-9% m/m of the solution with silicon oxide to 29-30% of the solution.

In one embodiment of the invention, the at least one acid, preferably boric acid, and the at least one metallic oxysalt, preferably sodium tungstate, can be added simultaneously.

In one embodiment of the invention, the stirring of the mixture that is carried out in step b) is carried out in a stirring tank at a frequency that is comprised in a range from 20 Hz to 40 Hz. In said embodiment of the invention, before the mixture resulting from step b) is treated according to step c) of the invention, it is transferred from the stirring tank to an ultrasonic processor system, in order to reduce the particle size of the non-metallic oxide in the dispersion, and it is stirred for an average time of approximately 12 hours for when the volume of the mixture is approximately 250 L. When the volume of the mixture is different from that mentioned above, the stirring time should be directly proportional to the volume of the mixture being stirred.

The particle size of the non-metallic oxide that the dispersion resulting from step b) must reach, after being stirred with ultrasound and before proceeding to step c), is comprised in a range from approximately 160 nm to approximately 180 nm. Said particle size is important because it makes it possible, by means of the coating method claimed in the present application and described hereunder, for the thickness necessary for coating the metal parts (substrates) to be obtained and to achieve the expected advantages, for example, to avoid corrosion due to humid and saline environments, and thermal oxidation of same.

In another embodiment of the invention, the non-metallic oxide, before dissolving in water according to step a), receives a pretreatment with hydrochloric acid (HCl) and ammonium hydroxide ($NH_4OH$).

The pretreatment consists of dissolving the non-metallic oxide, for example aerosil 380, under constant stirring in a previously prepared aqueous solution of HCl at 20% v/v and heated to a temperature in a range from approximately 55° C. to approximately 65° C. Once the non-metallic oxide has been dissolved in the HCl solution, 2.5 L of water, preferably distilled water, is added under the same stirring conditions and temperature. Finally, approximately thirty minutes after having added the water to the mixture, ammonium hydroxide is added (maintaining the temperature mentioned above and the constant stirring) until reaching a pH that is comprised in a range from approximately 8.4 to approximately 8.6.

Once the mixture has the necessary pH, it is left under constant stirring and at a temperature in a range from approximately 55° C. to approximately 60° C. for approximately two hours. After this time, the mixture is filtered under vacuum and the precipitate (the pretreated non-metallic oxide) is rinsed with water at room temperature to remove traces of HCl and ammonium hydroxide, for example, performing said rinsing at least 20 times. Once the non-metallic oxide pretreated with HCl and $NH_4OH$ is dry, it is placed in a furnace and left to dry for approximately 12 hours at a temperature of approximately 100° C.; after said time, it is removed from the furnace and ground in a refractory mill to obtain fine granules. Said fine granules are the ones that are used for the sol-gel process for synthesizing the coating.

The sol-gel process for synthesizing the inorganic ceramic coating of the second composition as previously described in the present invention is characterized in that it comprises at least the following steps:

mixing water with the at least one non-metallic oxide in a stirring tank so as to obtain a dispersion;

stirring said mixture for approximately one hour at room temperature;

adding to the dispersion obtained an aqueous solution of the at least one silicate-based component and mechanically stirring the resulting mixture at room temperature, when the composition comprises two or more silicates the process continues with step d), otherwise it continues with step e);

adding to the dispersion obtained an aqueous solution of the at least one second silicate-based component and mechanically stirring the resulting mixture at room temperature;

stopping stirring when a homogeneous mixture is obtained;

leaving the mixture to rest in order to achieve a homogeneous dispersion of the non-metallic oxide with the silicates;

once the homogeneous dispersion is reached, pouring into the mixture in the container, an aqueous solution of the at least one acid and starting to stir;

then adding an aqueous solution of the at least one metallic oxysalt;

subsequently, homogenizing the resulting mixture by mechanical stirring;

heating the mixture resulting from step g) to a temperature of approximately 60° C. for a time ranging from 30 minutes to approximately 3 hours;

at the end of the heating time, stopping the stirring and measuring the viscosity of the mixture resulting from step j) to determine if it is in the range from approximately 1.6 mPa s to approximately 2 mPa s, if the viscosity is outside said range, proceeding to step 1);

adding an additional volume of water, to approximately 3% of the volume of the mixture and stirring to achieve a viscosity of the resulting mixture that is in the range from approximately 1.6 mPa s to approximately 2 mPa s.

In one embodiment of the sol-gel process for synthesizing the inorganic ceramic coating of the second composition as described in the present invention, it is distinguished because an aqueous solution of the at least one silicate-based component is initially added to a stirring tank and the resulting mixture is stirred mechanically at room temperature. After that step, the steps d-j mentioned above are repeated.

The inorganic ceramic coatings of the first and second composition as described in the present invention, obtained through the processes based on sol-gel technology of the present application, prevent thermal oxidation, corrosion in saline and humid environments of the metal materials that are coated with same and that are exposed to temperatures in the range from 25° C. to 500° C.

The method by which the inorganic ceramic coating of the first composition as described in the present invention is deposited on a metal substrate mainly comprises three steps: (1) cleaning and activating the substrate, (2) coating the substrate, and (3) heat treatment (also referred to as curing of the coating deposited on the substrate).

The step of cleaning and activating the substrate comprises the consecutive execution of the following steps:

wetting the substrate with a detergent solution, which is an alkaline liquid degreaser, having a concentration in a range from approximately 4 to approximately 10% v/v under sonication and at a temperature in the range from approximately 60° C. to approximately 70° C. for a time of approximately 10 minutes;

wetting the substrate with a detergent solution, which is an alkaline liquid degreaser, having a concentration in a range from approximately 2% to approximately 8% v/v under constant stirring (not sonication) and at a temperature within the range from approximately 60° C. to approximately 65° C. for a time of approximately 10 minutes;

rinsing the substrate with water under constant stirring (not sonication) and at a temperature in the range from approximately 60° C. to approximately 65° C. for a time of approximately 10 minutes;

rinsing the substrate with water under constant stirring (not sonication) and at room temperature for a time of approximately 10 minutes.

wetting the substrate with a sulfuric acid solution having a concentration in a range from approximately 3 to approximately 5% v/v under constant stirring (not sonication) and at room temperature for a time from approximately 40 seconds to approximately 60 seconds;

wetting the substrate with deionized water without stirring and at room temperature for a time from approximately 1 minute.

The rinses in steps c) and d) are performed with water that can be selected from deionized or distilled water.

In step 2, corresponding to the coating of the substrate, the metal parts are first moistened with water, which can be selected from distilled or deionized water, before being coated by the coating produced according to the process described above.

Once the metal parts, such as stove top covers or oven cavities, have been moistened with water, the coating is applied by dipping or spraying.

In one embodiment of the invention, the spraying is carried out through reciprocating devices in order to guarantee the total covering of the metal parts.

In the final stage, the metal parts completely covered with the coating as described in the present invention, enter the curing process where the coating solidifies and provides the surface resistance to the parts.

The curing process comprises three heating ramps that run continuously (three zones), where the maximum temperature reached is approximately 500° C. and the minimum temperature is room temperature.

The time that the metal parts last in the curing process is comprised in a range from approximately 50 minutes to approximately 70 minutes.

The process consists of inserting the metal parts into a furnace, which can be selected from an electric furnace or a gas furnace, and running the three different heating ramps.

A first heating ramp consists of heating the coated metal artifacts from room temperature to a temperature selected in a range from approximately 95° C. to approximately 105° C. with a heating rate of approximately 10° C./minute, and maintaining them at said constant temperature for a time selected in a range from approximately 9 minutes to approximately 12 minutes.

After completing the constant heating time described in the first ramp, the process continues with a second heating ramp.

The second heating ramp consists of raising the temperature of the metal artifacts, which have previously been subjected to the first heating ramp, to a temperature selected in a range from approximately 195° C. to approximately 205° C. with a heating rate of approximately 100° C./minute, and maintaining them at said constant temperature for a time selected in a range from approximately 6 minutes to approximately 8 minutes.

After completing the constant heating time described in the second heating ramp, the process continues with a third heating ramp.

The third heating ramp consists of raising the temperature of the metal artifacts, which have previously been subjected to the first and second heating ramps, to a temperature that is selected in a range from approximately 445° C. to approximately 455° C. with a heating rate of approximately 200° C./minute, and maintaining them at said constant temperature for a time selected in a range from approximately 12 minutes to approximately 22 minutes.

Said curing process ends when the metal substrates have remained for the necessary time in the third and final temperature zone. Subsequently, the metal parts are transferred to a cooling tunnel in which they remain until reaching room temperature.

FIG. 7 depicts a graph showing a curing process performed and instrumented for metal artifacts coated with the ceramic coating of the first composition of the present invention. Points a and b correspond to the first heating ramp, point c corresponds to the constant temperature at which the artifacts are maintained during the second heating ramp, point d corresponds to the constant temperature and time at which the artifacts are maintained during the third heating ramp, and point "e" corresponds to the time during which the metal artifacts are subjected to the cooling tunnel.

The method by which the inorganic ceramic coating of the second composition is deposited as claimed in the present invention on a metal substrate is similar to the method described for depositing the coating of the first composition.

Examples are described below, which are intended to further illustrate, but not limit, the claimed inorganic coating.

Example 1

1500 L of an inorganic ceramic coating of the first composition as claimed in the present invention was prepared, comprising sodium tungstate as metallic oxysalt and in which the non-metallic oxide, silicon oxide (aerosil 380) was treated with HCl and ammonia.

1000 L water and 3,350 kg of silicon oxide ($SiO_2$) previously treated with hydrochloric acid and ammonia were added and stirred in a tank. Stirring was done mechanically.

Subsequently, the silicon oxide dispersion was added to a tank with greater capacity to add to it a volume of a potassium silicate solution ($K_2SiO_3$) previously prepared with 535 kg of said compound. Said mixture was stirred mechanically for approximately 15 minutes at room temperature until homogenizing the mixture.

Once the mixture was homogeneous, a volume of a sodium silicate solution ($Na_2SiO_3$) was added to the tank previously prepared with 103.5 kg of silicate, then it was stirred mechanically for approximately 5 minutes at room temperature until the mixture was homogeneous. Stirring was stopped and the solution was allowed to stabilize inside the tank for the time necessary in order to achieve a dispersion of the silicon oxide with the silicates.

Additionally, two aqueous solutions are prepared, a sodium tungstate solution with 11,700 kg of sodium tungstate and 15 L of water, and a boric acid solution with 1.4 kg of same and 15 L of water. In order to homogenize the mixtures, mechanical stirring was used in the preparation of each of the solutions.

Once the required stabilization time for the silicon oxide solution with silicates was reached, the previously prepared aqueous boric acid solution was added to the tank without stirring. After adding said solution, mechanical stirring was started. Approximately 60 minutes after the boric acid was added, the previously prepared sodium tungstate solution was added.

Subsequently, the mixture was heated for approximately 60 minutes and to a temperature of approximately 60° C.

At the end of the heating, it was stirred mechanically. Finally, the viscosity of the 1.8 mPa s sol-gel produced that will be used as an inorganic coating was measured.

Example 1.1

1500 L of an inorganic ceramic coating of the first composition as claimed in the present invention was prepared, comprising sodium tungstate as metallic oxysalt and in which the non-metallic oxide, silicon oxide (aerosil 380) is stirred with ultrasound to achieve a particle size ranging from 160 nm to 180 nm desired in the oxide dispersion.

900 L water and 6.13 kg of silicon oxide ($SiO_2$) previously stirred with water and by means of ultrasound were added and stirred in a tank until achieving a particle size comprised in a range from 160 nm to the 180 nm desired in the oxide dispersion.

Subsequently, the silicon oxide dispersion was added to a tank with greater capacity to add to it a volume of a potassium silicate solution ($K_2SiO_3$) previously prepared with 690.92 kg of said compound. Said mixture was stirred mechanically for approximately 15 minutes at room temperature.

Once the mixture was homogeneous, a volume of a sodium silicate solution ($Na_2SiO_3$) was added to the tank previously prepared with 87.36 kg, then it was stirred mechanically for approximately 5 minutes at room temperature until the mixture was homogeneous. Stirring was stopped and the solution was allowed to stabilize inside the tank for the time necessary in order to achieve a dispersion of the silicon oxide with the silicates.

Additionally, two aqueous solutions are prepared, a sodium tungstate solution with 15.77 kg sodium tungstate and 15 L of water, and a boric acid solution with 2.21 kg of said component and 15 L of water. In order to homogenize the mixtures, mechanical stirring was used in the preparation of each of the solutions.

Once the required stabilization time for the silicon oxide solution with silicates was reached, the previously prepared aqueous boric acid solution was added to the tank without stirring. After adding said solution, mechanical stirring was started. Approximately 60 minutes after the boric acid was added, the previously prepared sodium tungstate solution was added.

Subsequently, the mixture was heated for approximately 60 minutes and to a temperature of approximately 60° C.

At the end of the heating, it was stirred mechanically. Finally, the viscosity of the 1.8 mPa s sol-gel produced that will be used as an inorganic coating was measured.

Example 2

Plasticity analysis of the coatings of the second composition as claimed in the present invention by means of a microdurometer.

Uncoated and coated copper plates were used to perform this analysis, some with an inorganic coating comprising tungstates and others with a coating comprising molybdates.

A load in the range from approximately 10 $g_f$ to 1000 $g_f$ was applied to said plates by means of a microdurometer, using a tip with diamond geometry.

From the measurements that were taken of the diagonals of the equipment used, the area on which the load was applied is calculated and, together with the applied force, the resulting stress on the coating and the uncoated metal plate is calculated in order to evaluate the fracture resistance of the coatings. The data and calculations of this evaluation are summarized in Table 1.

TABLE 1

Data and calculation of the stress on uncoated copper plates, on copper plates coated with the chemical composition comprising tungsten (W) and coated with the chemical composition comprising molybdenum (Mo).

| Sample | Weight ($g_f$) | Diagonal 1 (μm) | Diagonal 2 (μm) | Force (N) | Area ($m^2$) | Stress (MPa) |
| --- | --- | --- | --- | --- | --- | --- |
| Cu | 1000 | 137.7 | 137.8 | 9.81 | 9.49E−09 | 1033.67 |
| Cu | 500 | 96 | 96.1 | 4.90 | 4.61E−09 | 1063.02 |
| Cu—W | 1000 | 195.5 | 195.6 | 9.81 | 1.91E−08 | 512.92 |
| Cu—W | 500 | 138.5 | 146.1 | 4.90 | 1.01E−08 | 484.66 |
| Cu—W | 300 | 113 | 113.7 | 2.94 | 6.42E−09 | 457.98 |
| Cu—W | 100 | 57.7 | 56 | 0.98 | 1.62E−09 | 607.02 |
| Cu—Mo | 1000 | 190.2 | 194.1 | 9.81 | 1.85E−08 | 531.29 |
| Cu—Mo | 500 | 136 | 137.6 | 4.90 | 9.36E−09 | 524.06 |
| Cu—Mo | 300 | 95.2 | 97.3 | 2.94 | 4.63E−09 | 635.24 |

Wherein: $g_f$ is gram-force.

From the figures described in the present application and from Table 1, it is shown that both inorganic coatings have mechanical strength.

Example 3

TABLE 2

Mass percentages of the essential components present in the inorganic coatings used in the present example:

| Essential component | % by mass |
| --- | --- |
| $H_2O$ | 20-70 |
| $SiO_2$ | 1-15 |
| $Na_2SiO_3$ | 1-15 |
| $K_2SiO_3$ | 20-70 |
| $H_3BO_4$ | 0.5-10 |
| $Na_2XO_4$ | 0.5-10 |

Wherein X: Mo, W.

Dilutions of the inorganic coatings of the second composition as claimed in the present invention that comprise molybdenum and of those that comprise tungsten were prepared according to the mass percentages indicated in Table 2, considering three different proportions: 75/25, 50/50 and 25/75 of coating and water, respectively.

Said dilutions were used to apply a layer of the inorganic coating on half of various copper plates that were subsequently subjected to a temperature of approximately 400° C., some of these were subjected for approximately 1 hour and others for approximately 3 hours.

The experiment was carried out on copper in order to more clearly visualize the barrier effect against thermal oxidation provided by the inorganic coatings claimed in the present invention, since said metal is very sensitive to oxidation. As can be seen in the images in FIG. 6, unoxidized copper has a reddish-brown color while oxidized copper has a black color.

In FIG. 6 we can see that the inorganic coating that includes molybdenum in its chemical composition withstands the heat treatment to which it is subjected for a longer time, approximately 3 hours, since in the photographs of the plates treated under this condition, the metallic copper continues to maintain a color similar to unoxidized copper; while the plates that comprise tungsten and that are treated during the same time begin to exhibit spots and black marks, which indicates that the metal (in this case copper) under the inorganic coating is oxidizing. For the case of heat treatment for 1 hour and for proportions of 50:50 and 25/75 (Theon: water), it is observed that the coloration of the plates is very similar; when the proportion is 70/25 for the same case (coating that includes W), it is observed that at 1 hour it has black spots, which may be due to the fact that the coating application was not homogeneous.

From the above, it can be concluded that the inorganic coatings claimed in the present invention act as a physical barrier and prevent thermal oxidation of the substrates on which they are adhered.

Example 4

The curing process to which the two metal substrates were subjected after an inorganic coating of the first composition was applied to them as described above in examples 1 and 1.1 of the present invention, consisted of inserting them into the continuous heating furnace and programming it automatically to:

Raise the temperature of the furnace in which said part is located from room temperature to 100° C. in a time of approximately 7.3 minutes. Once this temperature is reached, keep it constant for approximately 4 minutes.

After approximately 11.3 minutes have elapsed since the curing process began, raise the furnace temperature to approximately 200° C. in 7 minutes. Once this temperature is reached, keep it constant for approximately 6 minutes.

After 24.3 minutes have elapsed since the curing process began, raise the furnace temperature to approximately 450° C. in approximately 20.5 minutes. Once this temperature is reached, keep it constant for approximately 14 minutes.

58.8 minutes after the curing process began, the curing process is concluded and the furnace heating source is turned off, to take the parts to the cooling tunnel until they reach room temperature again.

Example 5

Steam resistance tests, saline chamber tests, impact tests, thermal shock tests were carried out and the thickness of two metal artifacts that were (1) coated by the coating method previously described in the present invention was measured, (2) with ceramic inorganic coatings of the first composition as described in examples 1 and 1.1 previously described, and that (3) were produced with the preparation process for the inorganic coating of the first composition as also described in the present invention, in order to demonstrate that they do present improvements in their physicochemical and aesthetic properties after being coated. The metallic oxysalt of family 6 (VIB) used in the sol-gel synthesis process was sodium tungstate. On the other hand, one of the coatings tested was obtained using in the sol-gel process, silicon oxide previously treated with hydrochloric acid and ammonia, while the second coating tested was obtained using silicon oxide previously treated with water and stirred with an ultrasonic processor.

The thermal shock test consists of repeating the following procedure three times on the same material: (1) subjecting the material to a constant temperature of 350° C. for 30 minutes, (2) removing it from the flask and (3) immediately cooling it in water to room temperature.

The impact resistance test consists of applying by means of an impact meter, which consists of a round steel tip and a guide tube, 20 pounds/in on the test surface.

The steam resistance test consists of exposing the material to a steam chamber for two continuous hours, which has a humidity of 100% that is controlled at a temperature of 93±2° C.

The salt chamber test consists of exposing a material to a saline mist (preparation of 5±1% sodium chloride) at a temperature of 35±12° C. for 24 hours with a 15° inclination of the appearance area.

The thickness of the coating layers was determined by an elcometer, which determines the amount of coating adhered to the material.

TABLE 3

Results of different tests applied to two coatings obtained based on what is described in the present invention

| TEST | Requirement | Coating with $SiO_2$ pretreated with HCl and $NH_3$ | Coating with $SiO_2$ pretreated with $H_2O$ and stirred with an ultrasonic processor |
|---|---|---|---|
| Steam resistance (2 hours) E9C29 | No visual change | Slight off-white color Regular | No change in appearance PASS |
| Hardness (durometer) E9B2E1 | ≥16N | >18N PASS | >18N PASS |
| Impact E9B3C | Direct: 1 pound/20 in. Coating should not be cracked | No cracking PASS | No cracking PASS |
| Thermal shock E9C3C 3 cycles: 0.5 h 350° C. and cool in water to room temperature | No cracking on the surface | No cracking PASS | No cracking PASS |
| Thickness E9B10 | 10 to 15 micrometers | 12.6 PASS | 13.4 PASS |
| saline chamber | No blistering of the coating | No detachment of the coating PASS | No detachment of the coating PASS |

As can be seen in the table, both the coating produced from silicon oxide previously pre-treated with water and stirred with an ultrasonic processor and the coating that was produced from silicon oxide previously pre-treated with ammonia and hydrochloric acid passed the tests to which they were submitted in accordance with internal requirements. Said results show that both coatings have anti-corrosive properties in humid and saline environments, as well as improved mechanical strength. It is only noted that the last mentioned coating has a slight off-white coloration that affects the aesthetics of the coating when the steam resistance test is carried out.

Example 6

The physical appearance of a stove without any coating was compared with that of a stove that was coated using (1) a coating of the first composition as claimed in the present invention and described in example 1.1, (2) produced by means of a sol-gel process as claimed in the present invention, and (3) applied to the metal based on the coating method claimed in the present invention after having been subjected to a heating test, which consisted of repeating five cycles per day until reaching 400 cycles and wherein each cycle included keeping the flame lit for one hour and then keeping it extinguished for half an hour.

As shown in FIG. 8a-8b, the stove without coating shows oxidation of the metal having a black-brown color while the stove with the coating does not have any oxidation (coloration). In this way, it is also verified that the coating of the invention resists thermal oxidation, which makes it possible to extend the useful life of the surface to which it is applied.

The embodiments of the invention that have been described are not intended to limit the scope of the invention, only to illustrate some of the variations that are within the spirit and scope of the invention.

The invention claimed is:

1. An inorganic ceramic coating, characterized in that it comprises from approximately 28% by mass to approximately 47% by mass of potassium silicate and from approximately 3.5% by mass to approximately 8% by mass of sodium silicate; at least one acid in the range from approximately 0.05% by mass to approximately 0.25% by mass; at least one metallic oxysalt of a family 6 (VIB) element in the range from approximately 0.5% by mass to approximately 2% by mass; water from approximately 47% by mass to approximately 70% and a non-metallic oxide in the range from approximately 0.1% by mass to approximately 0.75% by mass.

2. The inorganic ceramic coating as claimed in claim 1, characterized in that the at least one metallic oxysalt of a family 6 (VIB) element is selected from tungstates, molybdates or a combination thereof, the at least one acid is selected from boric acid ($H_3BO_4$), phosphoric acid ($H_3PO_4$) and sulfuric acid ($H_2SO_4$).

3. The inorganic ceramic coating as claimed in claim 1, characterized in that the at least one metallic oxysalt is selected from sodium tungstate ($Na_2WO_4$) and sodium molybdate ($Na_2MoO_4$).

4. The inorganic ceramic coating as claimed in claim 1, characterized in that the non-metallic oxide is silicon oxide.

* * * * *